Feb. 18, 1941.  A. SCHMID  2,232,480
WINDSHIELD WIPER
Filed March 5, 1940
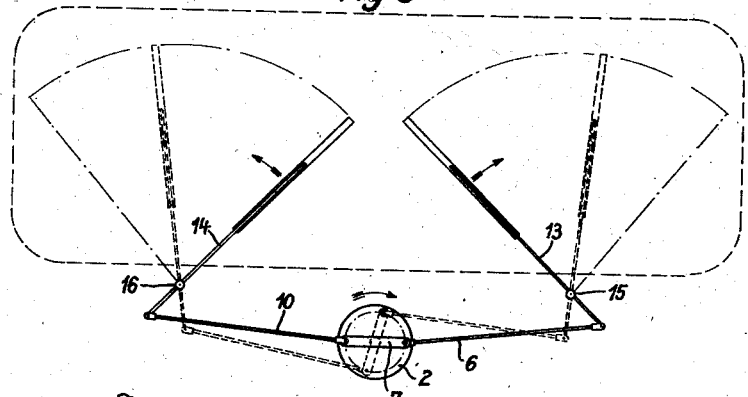
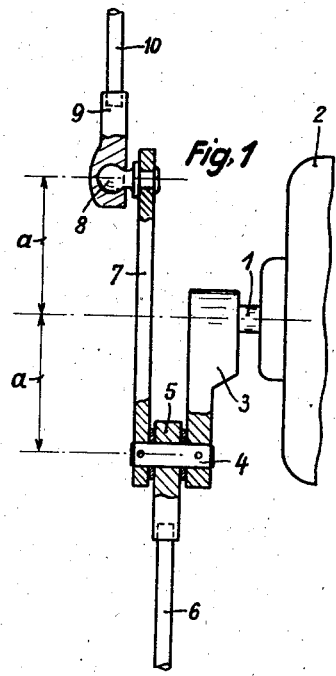
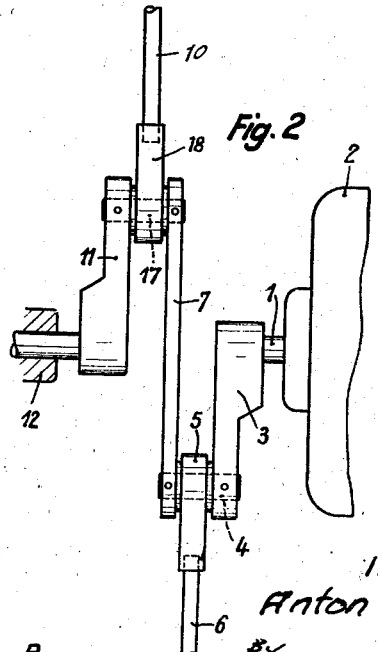
Inventor
Anton Schmid
By
Attorney Patented Feb. 18, 1941

2,232,480

UNITED STATES PATENT OFFICE 2,232,480

WINDSHIELD WIPER

Anton Schmid, Stuttgart, Germany, assignor to Robert Bosch Gesellschaft mit beschränkter Haftung, Stuttgart, Germany Application March 5, 1940, Serial No. 322,297
In Germany March 1, 1939

1 Claim. (Cl. 74—597)

This invention relates to windshield wipers, particularly for moving vehicles, having two oppositely moving wipers driven by means of a double crank, the links for the wiper arms being supported rotatively at the outer ends of the cranks.

The primary object of the invention is to provide a simple, inexpensive and compact windshield wiper of this kind, capable of efficient, reliable and durable operation. These and other advantages of the invention will be apparent from the accompanying drawing, taken in connection with the following description, showing as an example two embodiments of windshield wiping mechanism in which the arms are oscillated in opposite directions through equal angles. In the drawing, Fig. 1 shows a windshield wiper having a double crank journaled on one side only; Fig. 2 shows a double crank with a counter bearing; and Fig. 3 shows the windshield wiper installed on the windshield of a moving vehicle.

Referring to the embodiment of Fig. 1, secured to the drive shaft 1 of the windshield wiper motor 2 is a crank 3. Into the outer end of this crank a bearing pin 4 is inserted and pinned. On this pin is rotatively mounted a link 5 provided with an end socket, as shown in broken lines, for telescopically receiving a link 6. To the other end of the bearing pin 4 is pinned a crank 7 which extends oppositely to and has a length double that of the crank 3. At the other end of the crank 7 is secured a ball shaped pin 8 acting as a journal for a second link and forming a ball and socket connection therebetween. The second link comprises the portion 9 which has an end socket into which extends the portion 10 as shown in broken lines. The arm 7 rotates about the axis of the motor drive shaft 1 and the arrangement is such that the distances $a$ and $a$ are equal.

In the embodiment of Fig. 2, a third crank 11 is pinned to the end of bearing pin 17 and is provided with a journal that extends into the counter bore 2 arranged axially of shaft 1. As in the case of the link 5, 6, the other link 18, 10 is mounted rotatively on the bearing pin 17.

As shown in Fig. 3, the links 6 and 10 are loosely connected with the wiper arms 13 and 14 which are pivoted at 15 and 16, respectively. The arrows indicate the simultaneous movement of the wiper arms and the cranks, and the broken lines show an intermediate position thereof.

In assembling the double crank, the bearing pin 4 of either embodiment is first pinned to the crank 3, then the link 5 is pushed onto bearing pin 4, fitting rotatively thereon. The crank 7 is then pinned to the outer end of the bearing pin 4. The remaining assembly will be obvious, from which it will be understood that the construction is simple and the assembly of the parts may be accomplished rapidly and inexpensively.

I declare that what I claim is:

A transmission mechanism for operatively connecting a rotatable shaft to a pair of pivoted members having their pivots fixed relatively to said shaft, comprising a crank fastened to said shaft, an oppositely extending crank, a bearing pin rigidly fastening the two cranks in spaced relation axially of said shaft, a second bearing pin rigidly fastened to and extending outwardly of the outer end of said oppositely extending crank, and links loosely and directly connected to the respective bearing pins and also to the pivoted members on the same side of said pivots, whereby, upon continuous rotation of said shaft in one direction, said pivoted members are oscillated in opposite directions, said second bearing pin having a ball and socket connection with its link.

ANTON SCHMID.